Patented May 13, 1941

2,241,676

UNITED STATES PATENT OFFICE 2,241,676

INORGANIC PLASTIC

Otto C. Rohde and John P. Kelly, Toledo, Ohio, assignors, by mesne assignments, to Champion Spark Plug Company, Toledo, Ohio, a corporation of Delaware (1938)

No Drawing. Application May 24, 1937, Serial No. 144,480

33 Claims. (Cl. 106—9)

This application relates to a new type of plastic, somewhat analogous to plastics of the phenol-aldehyde and urea-aldehyde type, but including inorganic matter. This new type of plastic is capable of wide variations in composition and physical characteristics, and has marked advantages for various purposes. For example, it can be made to have high resistance to heat. The final product of one form, which will be described in detail, is unaffected by repeated and prolonged heating to as high as 1400° F.

Broadly, the invention consists in a product and a method of making it, similar to the known art in connection with phenol-aldehyde and urea-aldehyde plastics, but employing inorganic material in place of the phenol and a furan or analogous compound for the aldehyde. The inorganic materials found suitable are generally of the RO, $R_2O_3$ and $RO_2$ chemical groups, in which R may be any metal, and the combination with the furan compound is facilitated by water of combination in at least some of said material.

The furan compounds found particularly useful are furfural and furfur alcohol and similar compounds containing the furan ring and no other ring.

One specific method of producing the new product will be disclosed in detail, although in many instances the invention is not confined to the specific details, as will be more fully explained below.

One way to form a very satisfactory product of the kind to which this application relates is to mix powdered silicate, or talc, with boric oxide. A suitable proportion is 9 parts of talc to 1 part of boric oxide. Furfuryl alcohol is stirred into the mixed powder. A suitable proportion is approximately 4 ccs. of the alcohol to 25 grams of the mixed powder. Upon contact of the liquid with the powder, an exothermic reaction begins, and it is preferable to cool the receptacle in which the mixing takes place to keep the temperature down during the mixing operation. After the mixing has been completed and the initial reaction at room temperature has taken place, the mixture is heated, preferably in refluxing apparatus. The temperature in this refluxing operation may be raised to 320° F. to 330° F. where the material is not stirred during the operation, and somewhat higher if the material is agitated. It should not be raised so high that the gases condensed on the walls of the apparatus will be too viscous to flow back into the heated mass.

After the material has been refluxed at the specified heat for a suitable length of time, for example an hour and fifteen minutes, it is allowed to cool off. It is then in the form of powder which is somewhat caked, but can be readily crumbled by hand. It is then preferably ground and mixed so as to make it thoroughly homogeneous. This is particularly necessary where the material is not agitated during the refluxing operation. This grinding and mixing can be conveniently carried out in a ball mill. This ground and mixed powder is then heated gradually in the open up to a temperature of about 500° F. for about one hour. Thereafter, it is again cooled and ground so that it will pass through a 200 mesh screen. This powder is then placed in a mold loose, or pressed down by hand, and heated as rapidly as is convenient up to a temperature of about 550° F. In a mold three-fourths of an inch in diameter, this heating can be accomplished in about 15 minutes. It is kept at this temperature for a short time, which may be five minutes. Thereafter, it is subjected to relatively high pressure and the temperature maintained at about 550° F. A suitable pressure to employ is 10,000 pounds upon a mold three-fourths of an inch in diameter, which is of the order of 20,000 pounds per square inch. This pressure and heat are maintained for a few minutes, say about fifteen minutes. Thereafter, the pressure is maintained while the material is allowed to cool down to about 250° F. at which point it may be removed from the mold. Where the mold is suitably formed, the molded object may be cooled down to a lower temperature, but where a solid cylindrical mold is employed, it is easier to remove the molded slug at the temperature 250° F. than it is where it is cooled to a lower temperature.

By suitable formation of the mold, the object may be formed directly to the desired shape, or so that it requires very little final grinding or re-shaping, but where it is inconvenient to mold it directly to the final shape, the formed slug or blank can be worked to final shape by substantially any of the processes suitable for similarly shaping Bakelite or similar products.

The finished product is of a brownish color, unless some coloring matter is incorporated to change this natural color. At normal temperatures, its characteristics are quite comparable with hard Bakelite. It has very good electric insulating qualities, and it retains good dielectric properties up to at least 1000° F. and can be heated to 1400° F. temperature indefinitely without disintegration and will maintain its full mechanical strength.

The exact chemical formula by which the furfuryl alcohol, talc and boric oxide combine has not been determined, but there is evidently a reaction between these materials which results in a new chemical compound having new properties. These properties include that it is insoluble in and unaffected by gasoline or mineral oil and is but slightly soluble in sulfuric acid. It is attacked more readily by hydrochloric acid and is definitely soluble in nitric acid. It is also affected by alcohol and caustic soda, and somewhat by water.

While one specific manner of producing the material has been disclosed in detail with proportions, temperatures, pressures, etc., it will be readily understood that considerable variations may be made in these various details. It has been found also that there is a considerable range in the materials which can be employed.

For example, kaolin, dumortierite and brucite have been employed successfully in place of talc. However, the details of treatment have not been worked out with as much care as with talc, and the product has somewhat different characteristics, dependent upon composition and treatment. For example, while turnings of the product described above in detail are powdery, a product formed in substantially the same manner, but employing kaolin instead of talc, and increasing the proportion of furfuryl alcohol, forms shavings upon turning, and also is unaffected by water. It appears that an equivalent reaction will take place with various ceramic materials substituted for magnesium silicate, but that water of combination in the material greatly facilitates the reaction. The use of boric oxide is not necessary to obtain the reaction, particularly with such materials as kaolin, but it appears to facilitate the action and improve the product, particularly with talc.

Furfuryl alcohol reacts very readily and results in a satisfactory product, but furfural,

$C_4H_3O.CH:O$ has been used with success, and a similar reaction can be obtained with other furan products.

The exact proportions as well as the temperatures, pressures and other treatment will obviously vary with the exact characteristics of the desired product as well as with the composition of the materials employed. In the composition noted and with the treatment specified, the indicated proportion of boric oxide gives the best results. Less boric oxide results in a weaker product and too much boric oxide tends to result in some blistering upon heating. Also, the proportion of furfuryl alcohol noted is selected to give approximately maximum strength, although other proportions will produce a usable product.

While water of combination, as stated above, seems to be helpful in facilitating the desired chemical reaction, it is preferred to avoid any appreciable amount of free water. For example, the talc employed in successful production of the product in accordance with the process detailed above, contained only approximately .15% free moisture.

It will be noted that the inorganic compound employed in the example described in detail include MgO, of the RO group, $B_2O_3$ of the $R_2O_3$ group, and $SiO_2$ of the $RO_2$ group. In kaolin, only oxides of the $R_2O_3$ and $RO_2$ groups are present, while brucite is substantially hydrated MgO. To summarize, the broad invention, therefore, relates to the product of a furan compound and material of the RO, $R_2O_3$ and $RO_2$ groups, at least some of the said material comprising water of combination. Of the furan compounds, furfuryl alcohol and furfural react very readily. Boric oxide assists the reaction with the other materials, talc and boric oxide forming an excellent combination. High pressure, amounting to tons per square inch, is employed to prevent escape of gas during the final reaction.

The heat and pressure may be varied, but preferably are great enough in the final treatment to produce a combination which is not broken down by subsequent heat at atmospheric pressure to a temperature of at least 600° F. In the example given, as previously stated, the product is stable to a temperature of at least 1400° F.

The initial heating speeds up the reaction which would continue more slowly at lower temperatures. The powder produced by this first reaction is stable at ordinary temperatures, and may be stored or shipped for use when or where it is desired to mold the final product. It will be seen that the product of the first reaction may form an article of commerce, and in the appended claims it is termed a "moldable plastic" to distinguish from products of the final reaction.

The only boron compound named above is boric oxide, but other acidic compounds containing boron and oxygen such as boric acid, work in a similar manner.

What we claim is:

1. A product comprising a chemical combination of a furan compound containing the furan ring and no other ring with material of the group consisting of the RO, $R_2O_3$, and $RO_2$ chemical groups in which R may be any metal.

2. A product comprising a chemical combination of a furan compound containing the furan ring and no other ring with material of the RO, $R_2O_3$ and $RO_2$ chemical groups in which R may be any metal, at least some of the material containing water of combination before the combination with the furan compound.

3. A product comprising a chemical combination of a furan compound containing the furan ring and no other ring with material of the group consisting of the RO, $R_2O_3$, and $RO_2$ chemical groups in which R may be any metal, the material comprising an acidic compound containing boron and oxygen.

4. A product of chemical reaction of magnesium silicate, boric oxide and a furan compound containing the furan ring and no other ring.

5. A product of chemical reaction of magnesium silicate, boric oxide and furfuryl alcohol.

6. A product of chemical reaction of magnesium silicate, boric oxide and furfuryl alcohol, the magnesium silicate being approximately 9 times the amount of boric oxide.

7. A product of chemical reaction of magnesium silicate, boric oxide and furfuryl alcohol, the magnesium silicate being approximately 9 times the amount of boric oxide, and the furfuryl alcohol being an amount about 2 times the amount by weight of boric oxide.

8. A product of chemical reaction of kaolin and a furan compound containing the furan ring and no other ring.

9. A product of chemical reaction of kaolin, boric oxide and a furan compound containing the furan ring and no other ring.

10. A moldable plastic comprising a combination of a furan compound containing the furan ring and no other ring with material of the group consisting of the RO, $R_2O_3$ and $RO_2$ chemical groups in which R may be any metal.

11. A moldable plastic comprising a combination of a furan compound containing the furan ring and no other ring with material of the group consisting of the RO, $R_2O_3$ and $RO_2$ chemical groups in which R may be any metal, the material comprising an acidic compound containing boron and oxygen.

12. A moldable plastic comprising a combination of a furan compound containing the furan ring and no other ring, magnesium silicate and boric oxide.

13. A moldable plastic comprising a combination of furfuryl alcohol, talc and boric oxide.

14. A moldable plastic comprising a combination of a furan compound containing the furan ring and no other ring, kaolin and boric oxide.

15. A product comprising a combination of a furan compound containing the furan ring and no other ring with material of the group consisting of the RO, $R_2O_3$ and $RO_2$ chemical groups, in which R may be any metal, and stable under heat and atmospheric pressure up to at least 600° F.

16. A product of magnesium silicate, boric oxide and furfuryl alcohol, the magnesium silicate being approximately 9 times the amount of boric oxide, and stable under atmospheic pressure to a temperature of at least 1000° F.

17. A product comprising a combination of a furan compound containing the furan ring and no other ring and kaolin, and stable under atmospheric pressure to a temperature of at least 600° F.

18. The method of producing a moldable plastic which comprises digesting together a furan compound containing the furan ring and no other ring with material of the group consisting of the RO, $R_2O_3$ and $RO_2$ chemical groups in which R may be any metal.

19. The method of producing a moldable plastic which comprises digesting together a furan compound containing the furan ring and no other ring and material of the group consisting of the RO, $R_2O_3$ and $RO_2$ chemical groups in which R may be any metal, said material comprising water of combination.

20. The method of producing a moldable plastic which comprises digesting together a furan compound containing the furan ring and no other ring and material of the group consisting of the RO, $R_2O_3$ and $RO_2$ chemical groups in which R may be any metal, said material comprising an acidic compound containing boron and oxygen.

21. The method of producing a moldable plastic which consists in digesting together a furan compound containing the furan ring and no other ring with talc and boric oxide.

22. The method of producing a moldable plastic which consists in digesting together a furan compound containing the furan ring and no other ring with kaolin and boric oxide.

23. The method of producing a moldable plastic which consists in digesting together furfuryl alcohol and material of the group consisting of the RO, $R_2O_3$ and $RO_2$ chemical groups in which R may be any metal.

24. The method of producing a moldable plastic which consists in digesting together furfuryl alcohol, talc and boric oxide.

25. The method of producing a moldable plastic which consists in digesting together furfuryl alcohol, kaolin and boric oxide.

26. The method of producing a product which comprises digesting together a furan compound containing the furan ring and no other ring with material of the RO, $R_2O_3$, and $RO_2$ groups in which R may be any metal, at least some of the material containing water of combination, and treating the digested product under heat and pressure until it is stable under atmospheric pressure up to a temperature of at least 600° F.

27. The method of producing a product which consists in digesting together powdered talc, boric oxide and furfuryl alcohol, and treating the digested product under heat and pressure until the product is stable under atmospheric pressure to a temperature of at least 1000° F.

28. The method of producing a product which consists in digesting together kaolin, boric oxide and furfuryl alcohol, and treating the digested product under heat and pressure until the product is stable under atmospheric pressure to a temperature of at least 1000° F.

29. The method which comprises digesting together for about one hour at a temperature of between 300° F. and 400° F. a furan compound containing the furan ring and no other ring with material of the RO, $R_2O_3$, and $RO_2$ groups, in which R may be any metal, at least some of the material containing water of combination, cooling and grinding the digested material, giving the ground material a heat treatment substantially equivalent to heating it for one hour at 500° F., and pressing the treated material at about 550° F. under a pressure of the order of 20,000 pounds per square inch for a period of the order of 15 minutes.

30. A method in accordance with claim 29, and wherein the furan compound is furfuryl alcohol.

31. A method in accordance with claim 29 and wherein the furan compound is furfuryl alcohol and the material of the RO, $R_2O_3$ and $RO_2$ groups is chiefly a hydrated compound.

32. A method in accordance with claim 29 and wherein the furan compound is furfuryl alcohol and the material of the RO, $R_2O_3$ and $RO_2$ groups is chiefly talc.

33. A method in accordance with claim 29 and wherein the furan compound is furfuryl alcohol and the material of the RO, $R_2O_3$ and $RO_2$ groups is chiefly kaolin.

OTTO C. ROHDE.
JOHN P. KELLY.